(12) United States Patent
Lee et al.

(10) Patent No.: US 11,054,919 B2
(45) Date of Patent: Jul. 6, 2021

(54) WEARABLE DISPLAY DEVICE AND CONTROL METHOD THEREFOR

(71) Applicant: SAMSUNG ELECTRONICS CO., LTD., Suwon-si (KR)

(72) Inventors: Hyung Sun Lee, Suwon-si (KR); Jea-Sung Kim, Suwon-si (KR); Sang Ho Kim, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 16/961,410

(22) PCT Filed: Nov. 8, 2018

(86) PCT No.: PCT/KR2018/013576
§ 371 (c)(1),
(2) Date: Jul. 10, 2020

(87) PCT Pub. No.: WO2019/139238
PCT Pub. Date: Jul. 18, 2019

(65) Prior Publication Data
US 2020/0379581 A1   Dec. 3, 2020

(30) Foreign Application Priority Data
Jan. 12, 2018   (KR) .................. 10-2018-0004505

(51) Int. Cl.
*G06F 3/0354* (2013.01)
*G01S 13/06* (2006.01)
*G06F 3/038* (2013.01)

(52) U.S. Cl.
CPC .......... *G06F 3/03542* (2013.01); *G01S 13/06* (2013.01); *G06F 3/038* (2013.01); *G06F 3/03545* (2013.01)

(58) Field of Classification Search
CPC .. G01S 13/06; G06F 3/03542; G06F 3/03545; G06F 3/038
(Continued)

(56) References Cited

U.S. PATENT DOCUMENTS

| 7,053,965 B1 * | 5/2006 | Fan ....................... G06F 3/0346 348/734 |
| 9,858,712 B2 * | 1/2018 | Stathis ..................... G06T 17/20 |
| 2006/0139451 A1 * | 6/2006 | Yoneno ............ H04N 21/44213 348/114 |

FOREIGN PATENT DOCUMENTS

| JP | 2008-224584 | 9/2008 |
| KR | 10-2010-0113251 | 10/2010 |

(Continued)

OTHER PUBLICATIONS

International Search Report for PCT/KR2018/013576, dated Feb. 28, 2019, 4 pages.
(Continued)

*Primary Examiner* — Calvin C Ma
(74) *Attorney, Agent, or Firm* — Nixon & Vanderhye, P.C.

(57) ABSTRACT

An apparatus of detecting a relative position may include first and second receivers configured to receive signals transmitted from a portable device; and a processor configured to determine a position where the portable device is located and a direction indicated by the portable device based on a strength of a first signal received by the first receiver and a strength of a second signal received by the second receiver. The processor may be configured to determine the position where the portable device is located based on a sum between the strength of the first signal and the strength of the second signal, and to determine the direction
(Continued)

indicated by the portable device based on a difference between the strength of the first signal and the strength of the second signal.

15 Claims, 19 Drawing Sheets

(58) Field of Classification Search
USPC .................................................. 345/156, 173
See application file for complete search history.

(56) References Cited

FOREIGN PATENT DOCUMENTS

| KR | 10-1088019 | 11/2011 |
| KR | 10-1222173 | 1/2013 |
| KR | 10-2014-0114225 | 9/2014 |

OTHER PUBLICATIONS

Written Opinion of the ISA for PCT/KR2018/013576, dated Feb. 28, 2019, 5 pages.

* cited by examiner

FIG. 14

```
N=512
k=51
ω = 2 * π * k / N;
coeff = 2 * cos(ω);

sprev = 0;
sprev2 = 0;
for each index n in range 0 to N-1
s = x[n] + coeff * sprev - sprev2;
sprev2 = sprev;
sprev = s;
end
power = sprev2 * sprev2 + sprev * sprev - coeff * sprev * sprev2;
```

WEARABLE DISPLAY DEVICE AND CONTROL METHOD THEREFOR

This application is the U.S. national phase of International Application No. PCT/KR2018/013576 filed 8 Nov. 2018, which designated the U.S. and claims priority to KR Patent Application No. 10-2018-0004505 filed 12 Jan. 2018, the entire contents of each of which are hereby incorporated by reference.

TECHNICAL FIELD

The present disclosure relates to an apparatus and a method of detecting a relative position, and more particularly, to an apparatus and a method of detecting a relative position of a portable device located around an electronic device.

BACKGROUND ART

Electronic devices often need to detect a user's position or a position or direction of an object in an adjacent space for interaction with a user or the surrounding environment.

As a conventional method of detecting the position and posture of a general object, a method of projecting infrared rays with an RGB camera and utilizing a sensor for detecting depth information based on an infrared image reflected from surrounding objects has been proposed.

On the other hand, as methods of detecting a relative position and posture of a portable device such as a remote control device or a user terminal rather than the general object, a method in which the portable device detects a signal when the signal is transmitted from a mounted electronic device and detects the relative position and posture, and a method in which the portable device that detects the signal transmits a response signal and the electronic device uses an arrival time of the response signal to determine a distance between the devices have been proposed.

DISCLOSURE

Technical Problem

An aspect of the present disclosure is to provide an apparatus and a method of detecting a relative position provided to detect a signal transmitted from a portable device in an electronic device to detect relative positions of the electronic device and the portable device.

Technical Solution

An aspect of the disclosure provides an apparatus of detecting a relative position including: first and second receivers configured to receive signals transmitted from a portable device; and a processor configured to determine a position where the portable device is located and a direction indicated by the portable device based on a strength of a first signal received by the first receiver and a strength of a second signal received by the second receiver. The processor may be configured to determine the position where the portable device is located based on a sum between the strength of the first signal and the strength of the second signal, and to determine the direction indicated by the portable device based on a difference between the strength of the first signal and the strength of the second signal.

The processor may be configured to determine the strength of each of the first signal and the second signal using a maximum value of an envelope of each of the first signal and the second signal.

The processor may be configured to determine the strength of each of the first signal and the second signal using the Goertzel algorithm.

The processor may be configured to determine a distance between the apparatus of detecting the relative position and the portable device based on the sum between the strength of the first signal and the strength of the second signal and a distance between the first receiver and the second receiver.

The processor may be configured to determine the direction indicated by the portable device based on the distance between the apparatus of detecting the relative position and the portable device and the difference between the strength of the first signal and the strength of the second signal.

The processor may be configured to determine a relative position of the portable device with respect to the apparatus of detecting the relative position based on the distance between the apparatus of detecting the relative position and the portable device and the direction indicated by the portable device.

The processor may be configured to determine the direction indicated by the portable device based on a pattern of a strength of the signal transmitted from the portable device and the strength of the signal received by the first and second receivers.

The strength of the signal transmitted from the portable device may have a maximum strength in the direction indicated by the portable device. The strength of the signal transmitted from the portable device may decrease as it moves away from the direction indicated by the portable device.

Each of the first and second receivers may receive light transmitted from the portable device or a radio frequency (RF) signal transmitted from the portable device.

Another aspect of the disclosure provides a method of detecting a relative position including: receiving signals transmitted from a portable device through first and second receivers; determining a position where the portable device is located based on a sum between a strength of a first signal received by the first receiver and a strength of a second signal received by the second receiver; and determining a direction indicated by the portable device based on a difference between the strength of the first signal and the strength of the second signal.

The method may further include determining the strength of each of the first signal and the second signal using a maximum value of an envelope of each of the first signal and the second signal.

The method may further include determining the strength of each of the first signal and the second signal using the Goertzel algorithm.

The method may further include detecting a distance between an apparatus of detecting a relative position and the portable device based on the sum between the strength of the first signal and the strength of the second signal and a distance between the first receiver and the second receiver.

The method may further include detecting the direction indicated by the portable device based on the distance between the apparatus of detecting the relative position and the portable device and the difference between the strength of the first signal and the strength of the second signal.

The method may further include detecting a relative position of the portable device with respect to the apparatus of detecting the relative position based on the distance between the apparatus of detecting the relative position and the portable device and the direction indicated by the portable device.

The method may further include detecting the direction indicated by the portable device based on a pattern of a strength of the signal transmitted from the portable device and the strength of the signal received by the first and second receivers.

The strength of the signal transmitted from the portable device may have a maximum strength in the direction indicated by the portable device. The strength of the signal transmitted from the portable device may decrease as it moves away from the direction indicated by the portable device.

Each of the first and second receivers may receive light transmitted from the portable device or a radio frequency (RF) signal transmitted from the portable device.

Another aspect of the disclosure provides an apparatus of detecting a relative position including: first and second receivers; a processor; and a memory configured to store instructions for the processor to determine a position where a portable device is located and a direction indicated by the portable device based on a strength of a first signal received from the portable device by the first receiver and a strength of a second signal received from the portable device by the second receiver.

The memory may further store instructions for the processor to determine a distance between the apparatus of detecting the relative position and the portable device based on a sum of the strength of the first signal and the strength of the second signal and a distance between the first receiver and the second receiver, to determine the direction indicated by the portable device based on the distance between the apparatus of detecting the relative position and the portable device and a difference between the strength of the first signal and the strength of the second signal, and to determine a relative position of the portable device with respect to the apparatus of detecting the relative position based on the distance between the apparatus of detecting the relative position and the portable device and the direction indicated by the portable device.

Advantageous Effects

According to an aspect of an embodiment, there is provided an apparatus and a method of detecting a relative position provided to detect a signal transmitted from a portable device in an electronic device to detect relative positions of the electronic device and the portable device.

DESCRIPTION OF DRAWINGS

FIG. 14 is a view illustrating the Goertzel algorithm for signal strength detection.

MODES OF THE INVENTION

Figure 1:
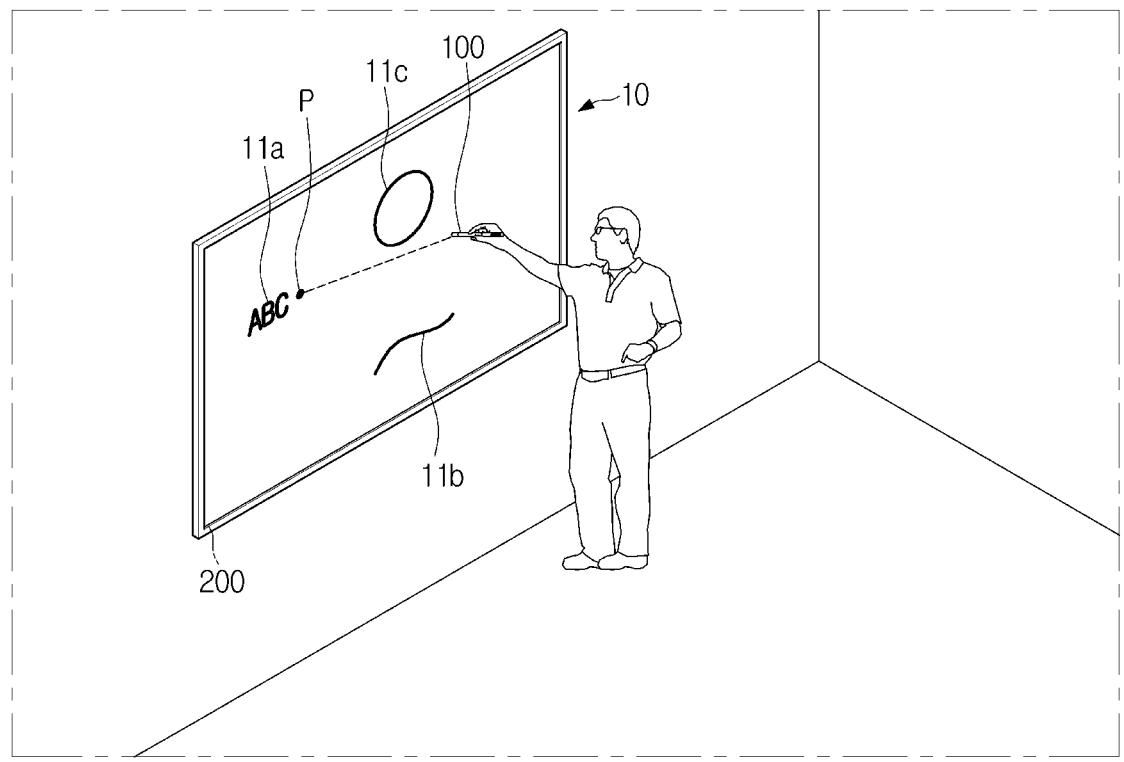
FIG. 1 is a view illustrating an example of use of an apparatus of detecting a relative position according to an embodiment.

Like reference numerals refer to like elements throughout the specification. Not all elements of embodiments of the disclosure will be described, and description of what are commonly known in the art or what overlap each other in the embodiments will be omitted. The terms as used throughout the specification, such as "~part," "~module," "~member," "~block," etc., may be implemented in software and/or hardware, and a plurality of "~parts," "~modules," "~members," or "~blocks" may be implemented in a single element, or a single "~part," "~module," "~member," or "~block" may include a plurality of elements.

It will be understood that when an element is referred to as being "connected" to another element, it can be directly or indirectly connected to the other element, wherein the indirect connection includes "connection" via a wireless communication network.

Also, when a part "includes" or "comprises" an element, unless there is a particular description contrary thereto, the part may further include other elements, not excluding the other elements.

As used herein, the singular forms "a," "an" and "the" are intended to include the plural forms as well, unless the context clearly indicates otherwise.

The present disclosure relates to an apparatus and a method of detecting a relative position, and more particularly, to an apparatus and a method of detecting a relative position of a portable device located around an electronic device.

A method of detecting the relative position of the portable device located around the electronic device is largely divided into three methods. First, a method has been proposed in which a mounted electronic device transmits a signal and the portable device detects the signal to detect the relative position and posture. In this method, since the battery-powered portable device has to constantly wait for the signal, the device consumes a lot of power and shortens the use time of the device. Since it is necessary to transmit the detected result back to the electronic device, an additional communication method is required, and there is a problem in that a delay time occurs when the detection result is used for interaction.

As a second proposed method of detecting the relative position between the electronic devices, when the signal is transmitted from the electronic device, the portable device that detects the signal transmits out a response signal, and the electronic device uses an arrival time of the response signal to determine a distance between the devices. Since this method has significant actual position detection error, it is only used for indoor positioning of mobile robots, etc., and is limited in application to interaction between the devices.

As a third proposed method of detecting the relative position between the electronic devices, the portable device transmits the signal at a moment where position and posture detection is necessary, and detects the position and relative posture of the portable device based on the signal detected by the electronic device. While this method has an advantage of preventing unnecessary power consumption, availability of user interaction is limited because only a position on a screen indicated by the portable device may be detected. Since a touch screen function and a function of detecting a direction indicated by the portable device are performed through the same optical sensor, there is a limitation in that it is difficult to apply the direction detection function when a different type of touch screen is applied depending on the situation.

The disclosure is intended to counter this problem. Hereinafter, an example to which the apparatus of detecting the relative position according to the disclosure is applied will be briefly described for ease of understanding, and then the apparatus and the method of detecting the relative position according to the disclosure will be described.

FIG. 1 is a view illustrating an example of use of an apparatus of detecting a relative position according to an embodiment.

Referring to FIG. 1, an apparatus of detecting a relative position 200 may be applied to a process of providing user interaction using a portable device 100 such as an electronic pen in an electronic device 10 such as a TV or an electronic blackboard.

In more detail, the apparatus of detecting the relative position 200 may be installed inside the electronic device 10 to detect a signal transmitted from the portable device 100, and may be provided to calculate relative positions and directions between the devices based on the detected signal. The electronic device 10 may receive a calculation result for the electronic device 10 of the portable device 100 and provide the user interaction using the portable device 100 in the electronic device 10.

The electronic device 10 may be provided in various forms, and is not limited to the installed position. For example, the electronic device 10 may be provided in a wall-mountable form that can be fixed to a wall, as illustrated in FIG. 1, and may be provided in a standing form according to the embodiment.

The electronic device 10 may be implemented as a TV, a computer monitor, a video wall, an electronic blackboard, signage, etc. provided as at least one display panel, and may be implemented in such a way that a plurality of the display panels are arranged in a matrix form to form a large screen according to the embodiment.

The electronic device 10 may be provided to operate as the electronic blackboard through execution of an embedded application. According to the embodiment, when the electronic device 10 is implemented as the TV, the electronic device 10 may operate as the electronic blackboard when a preset mode is performed or an application stored in a memory is activated.

A plurality of graphic objects may be displayed on the display panel provided on a front side of the electronic device 10. The graphic object may include not only videos, pictures, and photos, but also all content that can be visually displayed on the display panel such as an application launch window.

The electronic device 10 may be provided to receive a touch command from a user on the display panel or to receive the touch command from the portable device 100 such as an electronic pen.

In more detail, when the electronic device 10 receives the touch command for the display panel from the portable device 100, the electronic device 10 may continuously calculate coordinates on the electronic device 10 touched by the portable device 100 by continuously detecting an electromagnetic field generated from a tip of the portable device 100, and may display a preset image or graphic in the calculated coordinates of the display panel.

For example, the user may input a character 11a such as A, B, C by touching the portable device 100 on the display panel, and may input a line 11b, or a shape 11c such as a circle. In addition, the user may input various commands by touching the portable device 100 on the display panel.

The electronic device 10 may be provided to receive a pointing command of the portable device 100 performed on the front side of the display panel. Here, the pointing command may refer to a command input by an operation pointing to a specific point on the display panel using the portable device 100 such as an electronic pen.

In more detail, when the portable device 100 indicates the specific point of the display panel, the apparatus of detecting the relative position 200 installed in the electronic device 10 may calculate the relative position and direction of the portable device 100 with respect to the display panel based on the signal transmitted from the portable device 100. Hereinafter, in the specification, the meaning of calculating the relative position and direction of the portable device 100 may refer to calculating the position and direction of a reference point of the portable device 100. Here, the reference point of the portable device 100 may refer to the position and direction of a transmitting module, and more specifically, a signal transmission point and direction of a signal transmitter included in the transmitting module, but is not limited thereto.

Subsequently, the apparatus of detecting the relative position 200 may calculate the coordinates of the point indicated by the portable device 100 among various points on the display panel. As a result, the electronic device 10 may display the preset image or graphic at the coordinates of the calculated display panel of the apparatus of detecting the relative position 200.

For example, the user may input a pointing mark P around the characters 11a, such as A, B, C by pointing the display panel to the portable device 100 at a point spaced apart from a front surface of the display panel. In addition, the user may input the pointing mark P at a desired point by pointing the desired point on the display panel with the portable device 100.

As described above, the electronic device 10 may display various graphics on the display panel by functioning as the electronic blackboard, and display various graphic objects corresponding to the touch input of the portable device 100, display the pointing position of the portable device 100, and may perform various functions corresponding to the touch input of the portable device 100 according to the embodiment.

Hereinafter, the apparatus and the method of detecting the relative position provided to enable detection of the relative position with respect to the electronic device 10 of the portable device 100 will be described in more detail.

The apparatus and the method of detecting the relative position and the method according to the disclosure may be a concept including an apparatus and a method provided to enable detection of the relative position with respect to the electronic device 10 of the portable device 100, as well as the apparatus and the method provided to enable detection of the relative position with respect to a preset reference plane of the portable device 100 according to an installation position of a receiver, which is one of the components of the apparatus of detecting the relative position 200. Here, the reference plane may refer to a virtual plane arbitrarily set to be a reference for detecting the relative position of the portable device 100. For example, as described below, when detecting the relative position of the portable device 100 with respect to the installation position of first and second receivers, the reference surface may refer to a virtual surface arbitrarily set between the first and second receivers.

Hereinafter, the embodiment of the disclosure will be described on the assumption that the apparatus of detecting the relative position 200 according to the disclosure is provided to detect the relative position of the portable device 100 relative to the electronic device 10.

The apparatus of detecting the relative position 200 may be provided to detect the relative position of the portable device 100 relative to the electronic device 10 based on the signal transmitted from the transmitting module installed in the portable device 100. Therefore, a control configuration of the transmitting module provided in the portable device 100 will be described first, and then a control configuration of the apparatus of detecting the relative position 200 will be described.

In the drawings and related descriptions described below, although the transmitting module of the portable device 100 is illustrated and described so as to be distinguished from the apparatus of detecting the relative position 200, this is for convenience of description, and of course, the transmitting module may be included as the component of the apparatus of detecting the relative position 200.

Figure 2:
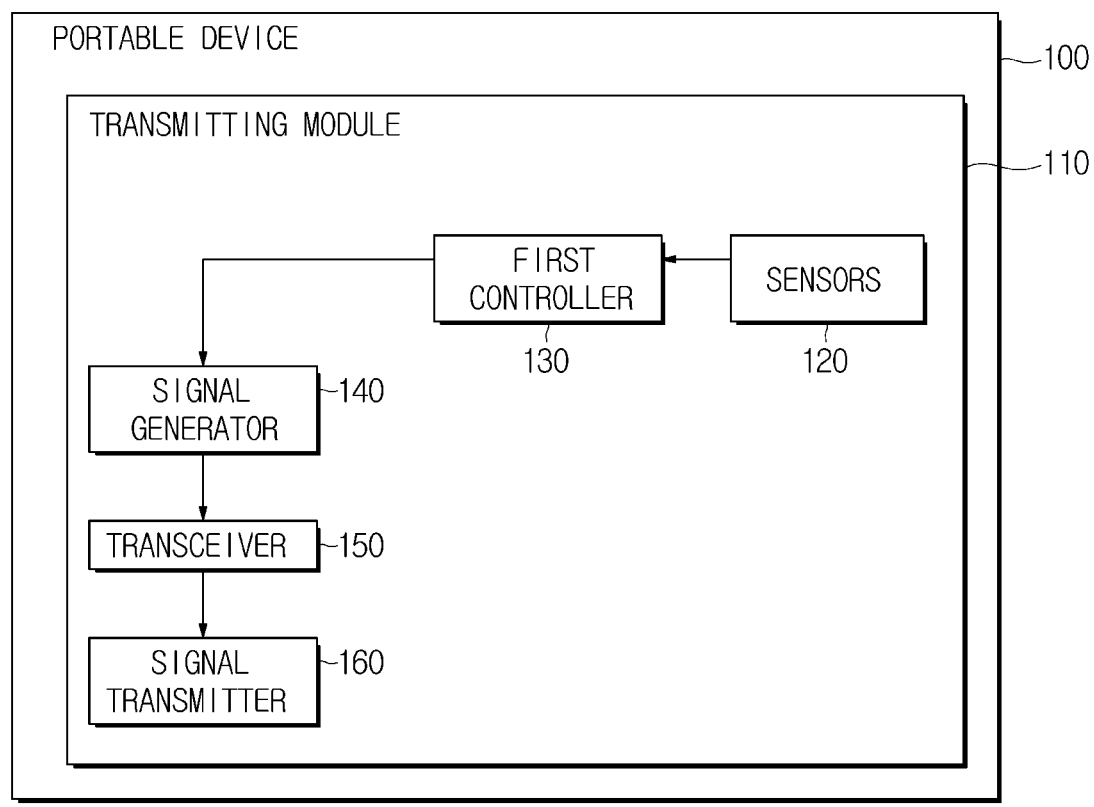
FIG. 2 is a control block diagram of a transmitting module provided in a portable device.

FIG. 2 is a control block diagram of a transmitting module provided in a portable device.

Referring to FIG. 2, the portable device 100 may include a transmitting module 110 provided to transmit the signal for transmitting the relative position and direction of the portable device 100 relative to the electronic device 10.

The transmitting module 110 may include a signal generator 140 that generates a system-specific signal, a transceiver 150 that converts the generated signal into an electrical signal according to the type of the applied signal, a signal transmitter 160 that transmits the converted electrical signal, and a controller 130 that controls the overall operation of the transmitting module 110, and may further include sensors 120 for detecting the user's intention according to the embodiment. Hereinafter, the controller 130 of the transmitting module 110 will be referred to as the first controller 130 to distinguish it from the control configuration of the apparatus of detecting the relative position 200 described later.

The signal generator 140 may generate the system-specific signal under the control of the first controller 130, and transmit the generated signal to the transceiver 150. The signal generator 140 may generate an RF signal or an optical signal under the control of the first controller 130 and transmit the generated signal to the transceiver 150.

The transceiver 150 is provided to convert the signal received from the signal generator 140 to the electrical signal. The transceiver 150 may be implemented as an RF transceiver, an optical transceiver, etc. according to the type of the applied signal.

The signal transmitter 160 may be a concept including a pattern signal transmitter provided to transmit the signal in a specific pattern. Here, the specific pattern may refer to a pattern having a maximum strength in the direction indicated by the portable device 100 and a pattern in which a signal strength decreases as an angle increases.

At least one of a directional radio frequency (RF) antenna and a light emitting diode (LED) may be used as the type of the signal transmitter. Hereinafter, characteristics of each signal transmitter will be described with reference to the accompanying drawings.

Figure 3A:
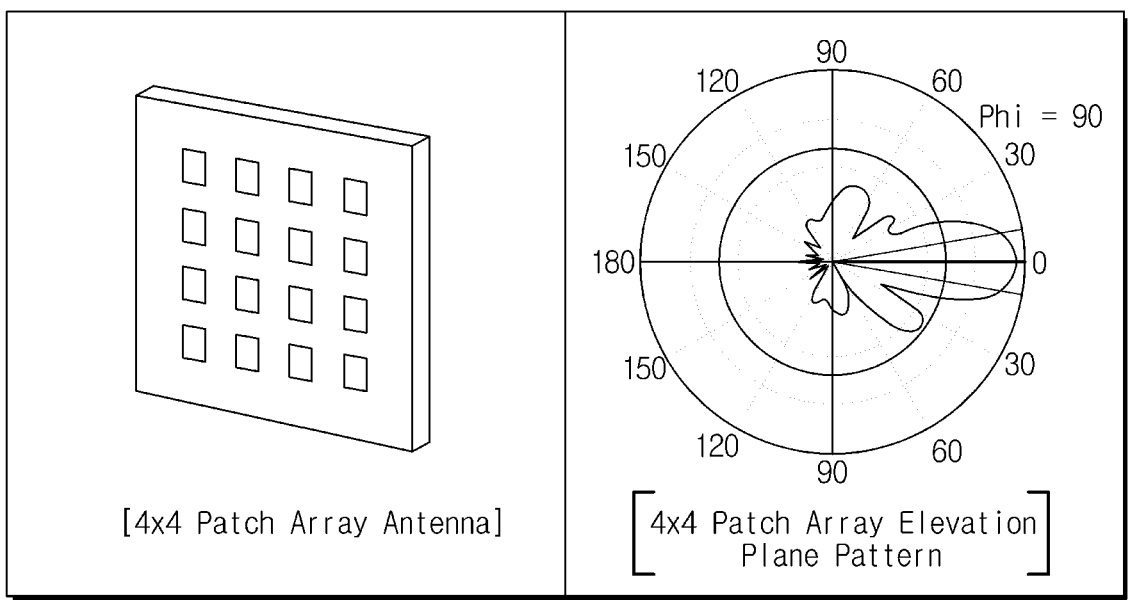
FIG. 3A is a view illustrating an example of a structure of an RF antenna and a radiation pattern of an RF signal.

FIG. 3A is a view illustrating an example of a structure of an RF antenna and a radiation pattern of an RF signal.

Referring to FIG. 3A, as the RF antenna, the largest signal is transmitted at 0°, and the RF antenna provided such that both the signal strength and the signal strength reduction are monotonically decreasing as the angle increases may be used. FIG. 3A illustrates a 4×4 patch array antenna as an example of the RF antenna for convenience of description, but the type of the RF antenna is not limited to this, and other types of RF antennas having a monotonically decreasing beam pattern may be used. When the RF antenna is used as the signal transmitter, the transceiver 150 may be implemented as the RF transceiver driving the RF antenna.

Figure 3B:
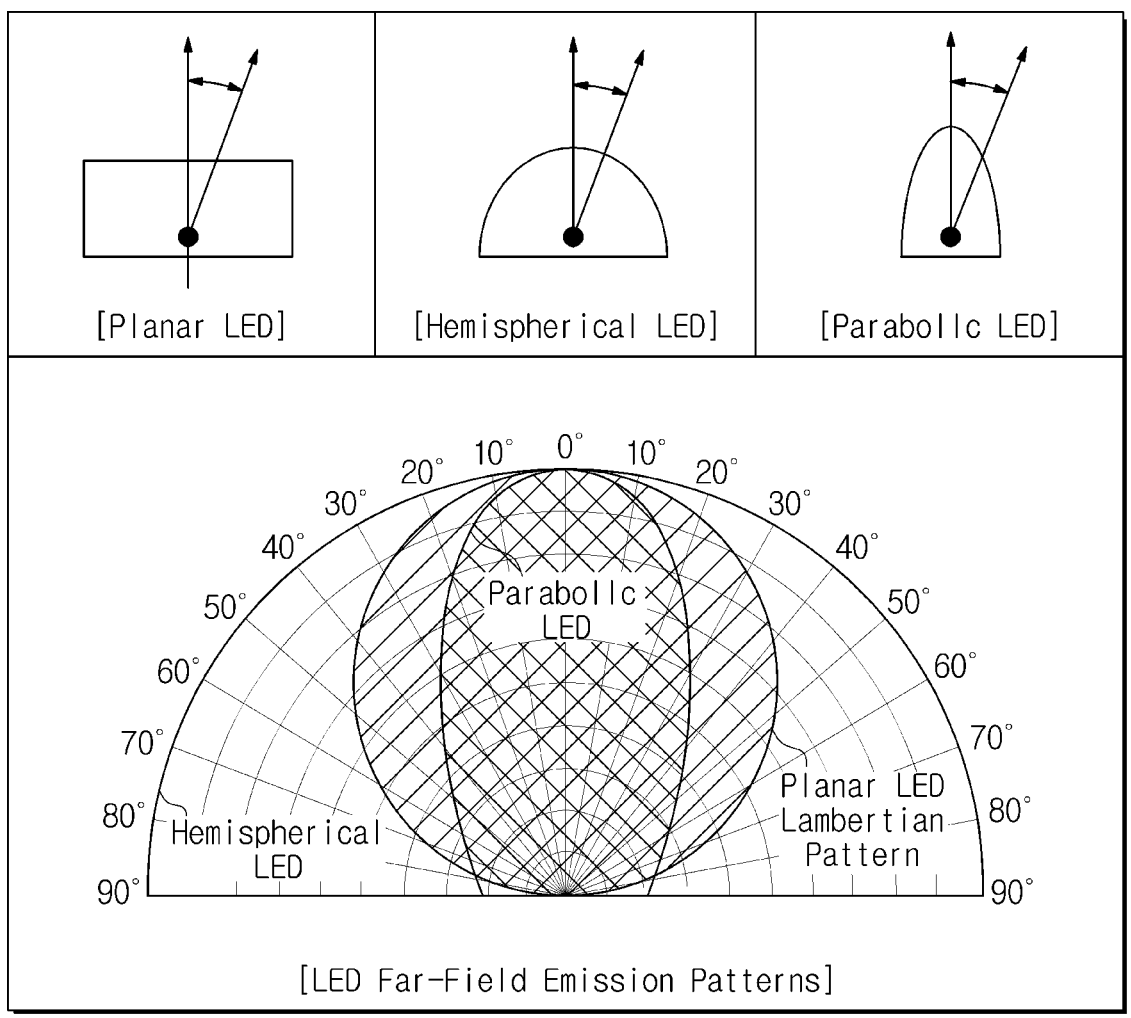
FIG. 3B is a view illustrating radiation characteristics by type of a light emitting diode.

FIG. 3B is a view illustrating radiation characteristics by type of a light emitting diode.

In the disclosure, the largest signal is transmitted at 0°, and it is possible to use the signal transmitter provided to monotonically decrease both the signal strength and the signal strength reduction as the angle increases. FIG. 3B illustrates an example of the signal transmitter having such beam pattern, and a planar light emitting diode (planer LED), a semispherical light emitting diode (semispherical LED), and a parabolic light emitting diode (parabolic LED) are illustrated, but the example of the signal transmitter is limited to the example of FIG. 3B. It goes without saying that other types of signal transmitters having monotonically decreasing beam patterns may be used. When the LED is used as the signal transmitter, the transceiver 150 may be implemented as the optical transceiver driving the LED.

The first controller 130 may control the overall operation of the transmitting module 110 and the signal flow between internal components of the transmitting module 110, and may perform a function for processing data.

The first controller 130 may include a processor, read only memory (ROM) in which a control program for controlling the transmitting module 110 is stored, and random access memory (RAM) used as a storage area corresponding to various tasks performed by the transmitting module 110 or to store signals or data input from the outside of the transmitting module 110.

The first controller 130 may output a control signal to activate or deactivate the signal generator 140 when a predetermined time interval or a preset condition is satisfied.

For example, the first controller 130 may output a control signal to detect the user's intention based on sensor value information received from the sensors 120 and activate or deactivate the signal generator 140.

The sensors 120 may be provided as at least one of a touch sensor, a motion sensor, and a gripping sensor, and the operation principle of each of the sensors is as follows.

First, the touch sensor may receive the user's touch input to generate a sensor value, and output the generated sensor value to the first controller 130. The first controller 130 may output the control signal to activate the signal generator 140 based on the sensor value information received from the touch sensor.

The motion sensor may detect a movement of the portable device 100 to generate a sensor value, and output the generated sensor value to the first controller 130. The first controller 130 may output the control signal to activate the signal generator 140 based on the sensor value information received from the motion sensor.

The gripping sensor may be provided to detect a gripping state of the user when the user grips the portable device 100 to use the portable device 100. The gripping sensor may be implemented as a capacitive sensor or a plurality of touch sensors installed in a gripping portion of the portable device 100. The gripping sensor may detect the user's grip to generate a sensor value, and may output the generated sensor value to the first controller 130. The first controller 130 may output the control signal to activate the signal generator 140 based on the sensor value information received from the gripping sensor.

On the other hand, the type of the sensor provided in the sensors 120 is not limited to the above-described examples, and should be broadly understood as a concept including all types of sensors provided to detect the user's intention.

Figure 4:
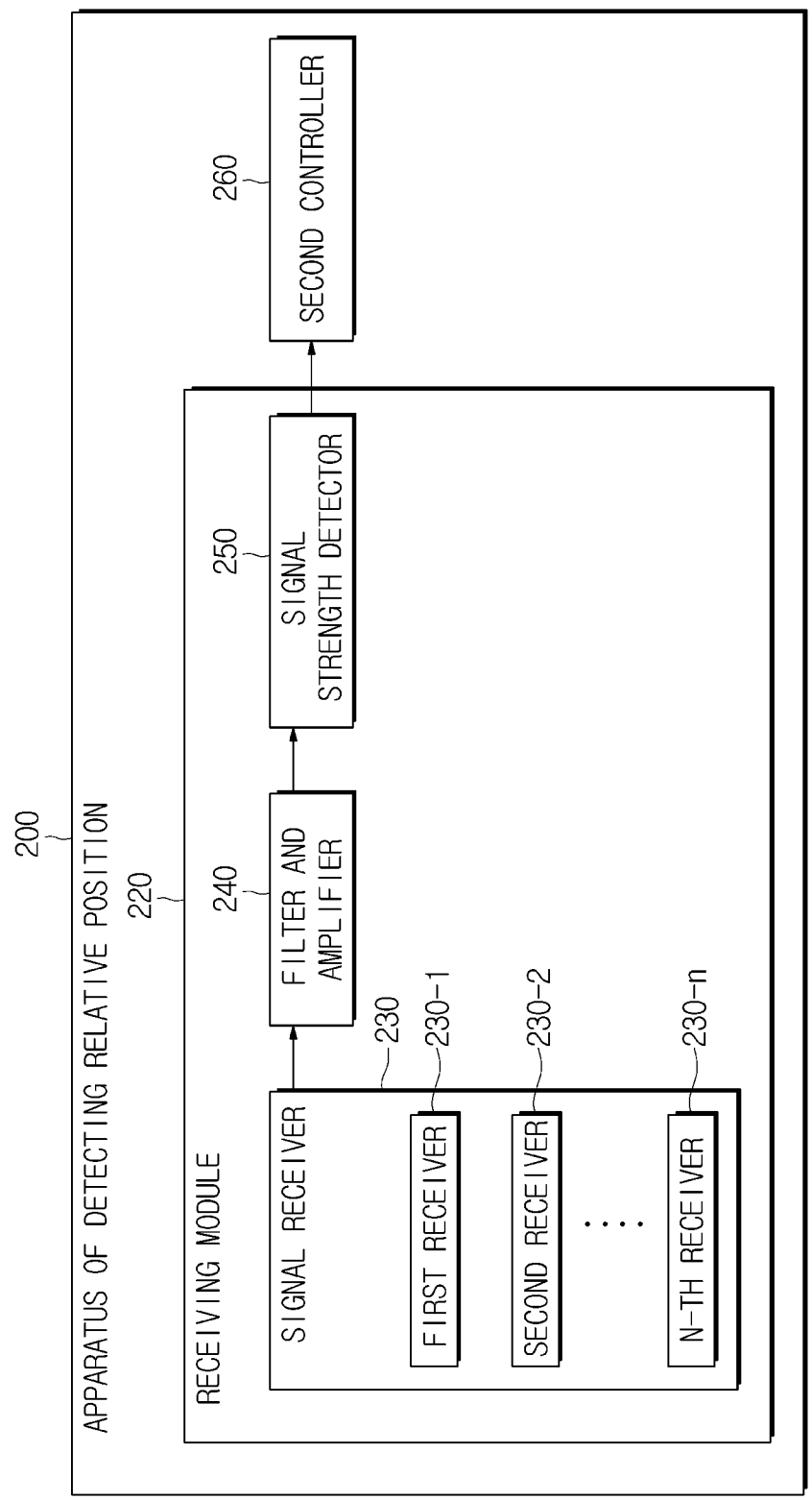
FIG. 4 is a control block diagram of an apparatus of detecting a relative position according to an embodiment.

FIG. 4 is a control block diagram of an apparatus of detecting a relative position according to an embodiment.

The apparatus of detecting the relative position 200 may be applied to the object that is a reference for detecting the relative position of the portable device 100, such as the electronic device 10, and may be provided to detect the relative position and direction between the devices.

Referring to FIG. 4, the apparatus of detecting the relative position 200 may include a receiving module 220 provided to receive the signal transmitted from the transmitting module 110, and a controller 260 that controls the overall operation of the apparatus of detecting the relative position 200. Hereinafter, the controller 260 of the apparatus of detecting the relative position 200 will be referred to as the second controller 260 to distinguish it from the control configuration of the transmitting module 110 described above.

The receiving module 220 may include a signal receiver 230 including a plurality of receivers, a filter and amplifier 240, and a signal strength detector 250.

The signal receiver 230 may include a plurality of receivers 230-1, 230-2, . . . , and 230-n, (n is an integer greater than or equal to 3) provided to detect the signal transmitted from the transmitting module 110. The plurality of receivers 230-1, 230-2, . . . , and 230-n include the first receiver 230-1, the second receiver 230-2, . . . , and the n-th receiver 230-n. Each of the receivers may be arranged in pairs of two. The second controller 260 may detect the relative position and direction of the portable device 100 based on the signal information received from one pair of the signal receivers.

For example, the signal receiver 230 may be a pair of the first receiver 230-1 and the second receiver 230-2, and may be arranged in an X-axis direction or a Y-axis direction with respect to the reference plane. Although not illustrated, a third receiver and a fourth receiver are paired and may be arranged in the X-axis direction or the Y-axis direction with respect to the reference plane. When the first and second receivers 230-1 and 230-2 are paired and arranged in the X-axis direction with respect to the reference plane, the second controller 260 may detect the relative position and direction of the portable device 100 with respect to the installation positions of the first and second receivers 230-1 and 230-2 based on the signals received from the first and second receivers 230-1 and 230-2.

The apparatus of detecting the relative position 200 forms a detecting area for the portable device 100 around the signal receiver 230, and it is possible to determine the positions of the plurality of receivers 230-1, 230-2, . . . , and 230-n according to the detecting area to be implemented.

The signal receiver 230 may be provided in a structure corresponding to the type of transmission structure according to the type of transmission structure applied to the signal transmitter 160. For example, the RF antenna may be applied to the signal receiver 230 when the RF signal is used for signal transmission, and the optical sensor such as a photodiode may be used for the signal receiver 230 when the optical signal is used for signal transmission.

The filter and amplifier 240 may be provided to remove noise and amplify the signal to restore the signal received from the signal receiver 230. Since the output of the signal receiver 230 may be attenuated in some cases and may be mixed with noise, the filter and amplifier 240 that removes noise and amplifies the signal may be used to restore the signal.

Figure 5:
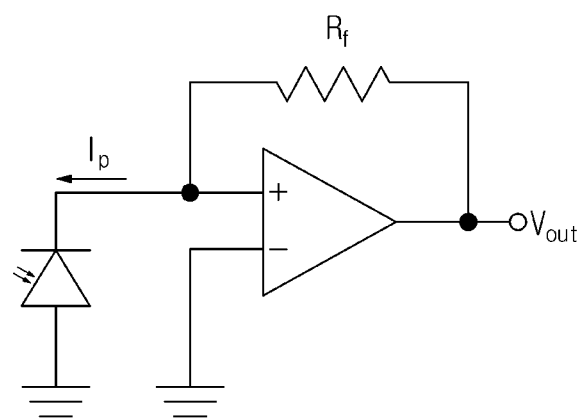
FIG. 5 is a view illustrating a configuration example of a transimpedance amplifier.

The type of the filter and amplifier 240 may also be provided in a structure corresponding thereto according to the type of the applied signal. For example, when the optical signal is used for signal transmission, the filter and amplifier 240 may be configured as a transimpedance amplifier as illustrated in FIG. 5. Referring to FIG. 5, the transimpedance amplifier may be provided to convert a photocurrent of the photodiode into a voltage.

When a modulated signal is used or a plurality of the transmitting modules 110 having different frequencies are used according to the embodiment, a signal restoration portion may be additionally used to be provided to restore the signal of the signal generator 140 of each of the transmitting modules 110.

The signal strength detector 250 may be provided to measure the strength of the received signal. The signal strength detector 250 may be provided as an envelope detector.

Figure 6:
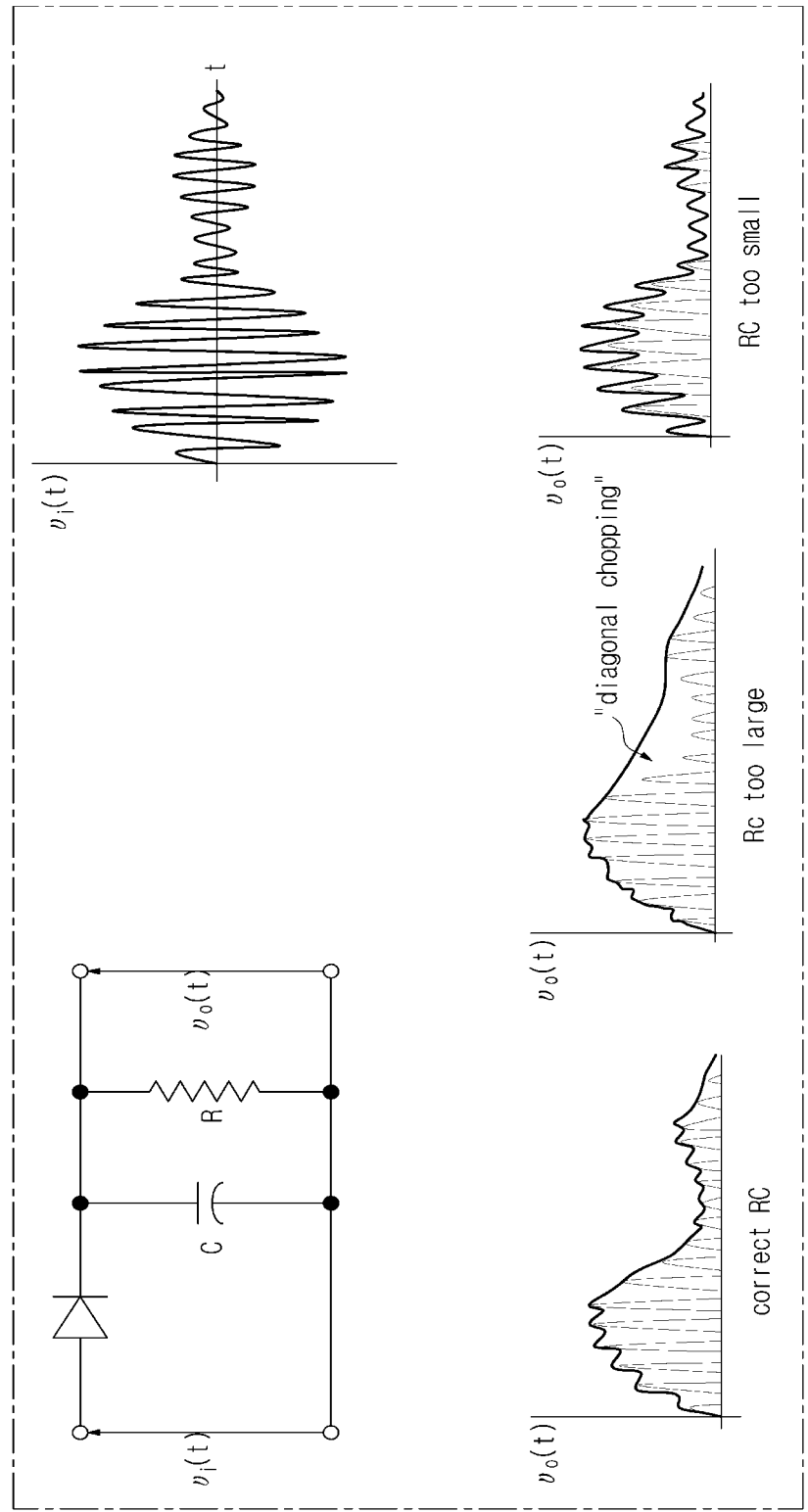
FIG. 6 is a view illustrating an example of detecting an envelope detected through an envelope detector.

FIG. 6 is a view illustrating an example of detecting an envelope detected through an envelope detector.

Referring to FIG. 6, when a transmission signal is composed of one periodic signal, as illustrated in FIG. 6, the signal strength may be detected through a maximum value of the envelope detected through the envelope detector.

According to the embodiment, when the plurality of transmitting modules 110 having different frequencies are used and signals having one or more frequencies are detected in a complex manner, the Goertzel algorithm may be used for a digital conversion signal to detect a magnitude of a desired frequency signal.

Figure 7:
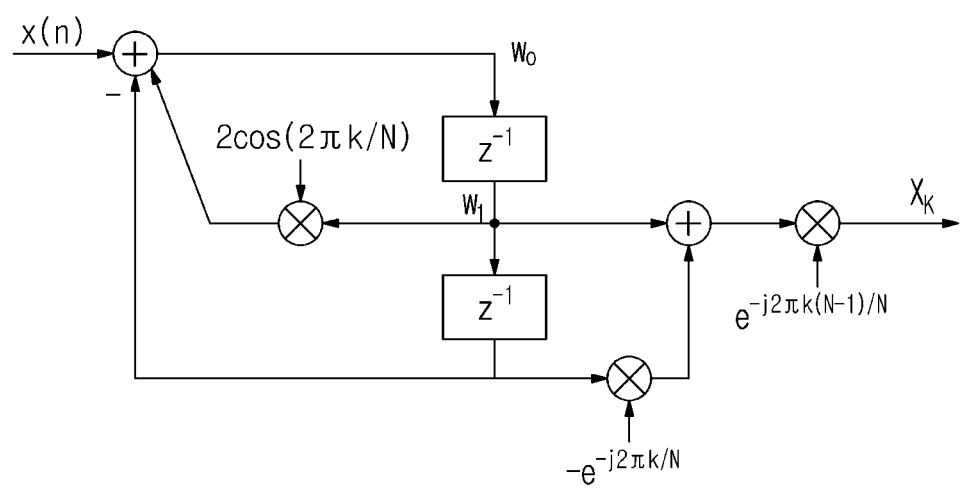
FIG. 7 is a conceptual view of the Goertzel algorithm.

FIG. 7 is a conceptual view of the Goertzel algorithm.

Referring to FIG. 7, the Goertzel algorithm is for analyzing one selectable frequency component from a discrete signal and has a numerically efficient characteristic in measuring a magnitude of some specific frequency components rather than the entirety of frequency components.

The second controller 260 may control the overall operation of the apparatus of detecting the relative position 200 and the signal flow between the internal components of the apparatus of detecting the relative position 200, and may perform the function for processing data.

The second controller 260 may include the ROM in which a control program for controlling the apparatus of detecting the relative position 200, the RAM used as the storage area corresponding to various tasks performed by the apparatus of detecting the relative position 200 or to store signals or data input from the outside of the apparatus of detecting the relative position 200, and the processor that performs an operation to perform the operation of the apparatus of detecting the relative position 200 according to programs and data stored in the ROM and RAM.

Particularly, when the second controller 260 receives the signal from the receiving module 220, the second controller 260 may detect the relative position and direction of the portable device 100 with respect to the installation positions of the receiving module 220 based on the signals received from the receiving module 220. Particularly, the second controller 260 may detect the relative position and direction of the portable device 100 with respect to the installation positions of the first and second receivers 230-1 and 230-2 based on the signals received from the first and second receivers 230-1 and 230-2.

As described above, the control configuration of the portable device 100 and the apparatus of detecting the relative position 200 according to the embodiment have been described. In the control configuration described above, a case in which the receiving module 220 and the second controller 260 are included as components of the apparatus of detecting the relative position 200 has been described as an example, but this is for understanding. The apparatus of detecting the relative position 200 may be organically combined with the transmitting module 110 installed in the portable device 100 to perform the function.

Hereinafter, the apparatus and the method of detecting the relative position according to the disclosure will be described in more detail with reference to the accompanying drawings.

Figure 8:
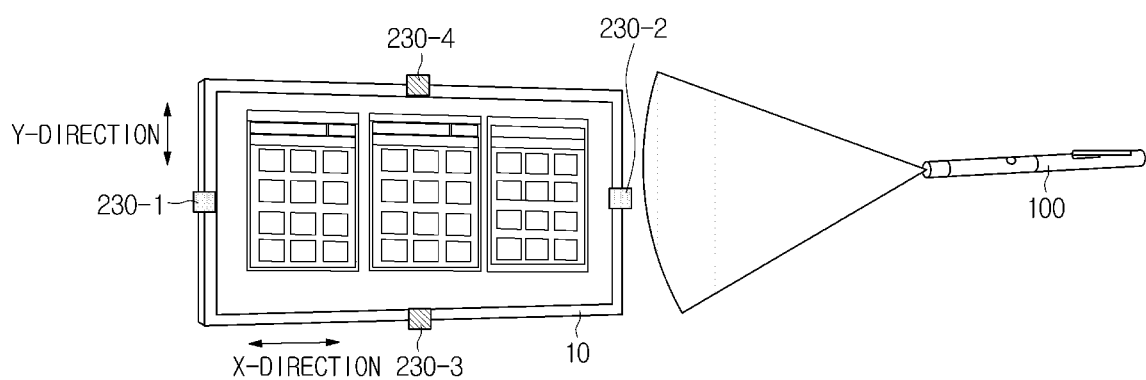
FIG. 8 is a view illustrating a system configuration in which four receiving modules are mounted on an electronic device.

FIG. 8 is a view illustrating a configuration of a system of detecting a relative position according to an embodiment.

Referring to FIG. 8, a system of detecting the relative position according to the embodiment may be provided in a form in which four receivers are mounted on upper, lower, left, and right corners of the electronic device 10. For example, the first receiver 230-1 and the second receiver 230-2 may be installed at left and right edges of the electronic device 10 in the X-axis direction of the electronic device 10, respectively. A third receiver 230-3 and a fourth receiver 230-4 may be installed at upper and lower edges of the electronic device 10 in the Y-axis direction of the electronic device 10, respectively. The first and second receivers 230-1 and 230-2 may form a pair of receivers, and may be a position detection reference of the portable device 100. The third and fourth receivers 230-3 and 230-4 may form a pair of receivers, and may be the position detection reference of the portable device 100.

FIG. 8 illustrates an example of an arrangement form for a pair of receivers, and the arrangement form of the pair of receivers is not limited by FIG. 8. As the number of receivers disposed in upper, lower, left, and right corners increases, the detection accuracy of the apparatus of detecting the relative position 200 may be improved.

The type of signal used in the system of FIG. 8 may be selected in consideration of various factors such as noise factors according to the environment to which the system is applied, the size and mounting method of the transmitting and receiving modules 110 and 220, and power consumption of the signal transmitter. For example, as described above, RF signals, optical signals, and the like may be used. Hereinafter, the operation principle of the apparatus of detecting the relative position 200 according to the disclosure and the method of detecting the relative position will be described by taking a case where a circuit of a transmitter/receiver is configured for the optical signal.

Figure 9:
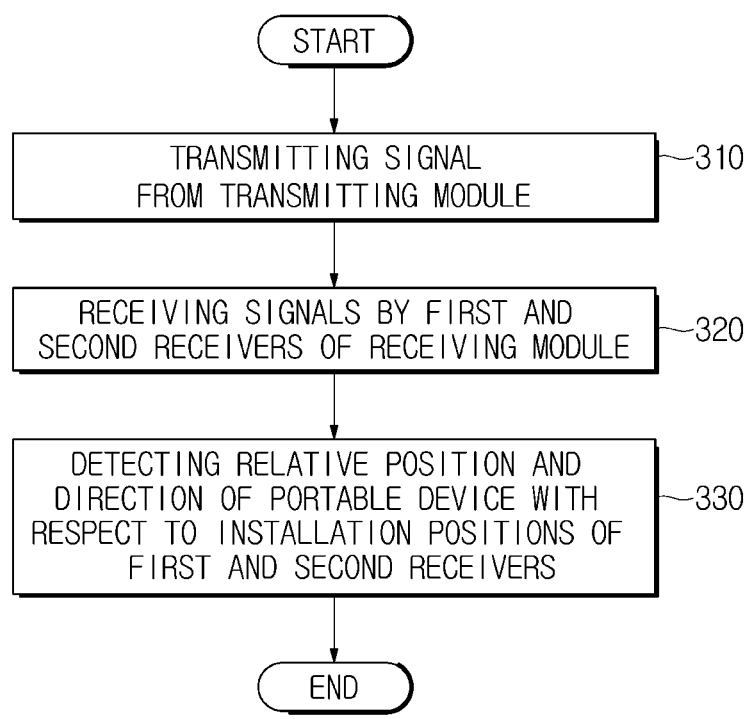
FIG. 9 is a view illustrating a signal flow and an operation principle of a transmitting module of a portable device and an apparatus of detecting a relative position in the system of FIG. 8.

FIG. 9 is a view illustrating a flow of the method of detecting the relative position of the portable device 100 with respect to a reference plane according to an embodiment.

Referring to FIG. 9, the method of detecting the relative position of the portable device 100 may include an operation 310 of transmitting the signal from the transmitting module 110, an operation 320 of receiving the signals from the first and second receivers 230-1 and 230-2 of the receiving module 220, an operation 330 of detecting the relative position and direction of the portable device 100 with respect to the installation positions of the first and second receivers 230-1 and 230-2 based on the signals received from the first and second receivers 230-1 and 230-2.

First, a process of generating the optical signal in the transmitting module 110 of the portable device 100 will be described as follows (310).

The transmitting module 110 may output the control signal that controls the operation of the signal generator 140 through the first controller 130, and the signal generator 140 may generate the optical signal unique to the system according to the received control signal to drive the optical transceiver.

According to an example, the signal generator 140 may drive the optical transceiver by generating the signal in a frequency band that does not naturally exist in order to distinguish the signal transmitted from the transmitting module 110 from noise in an infrared band existing in the surrounding environment.

Figure 10:
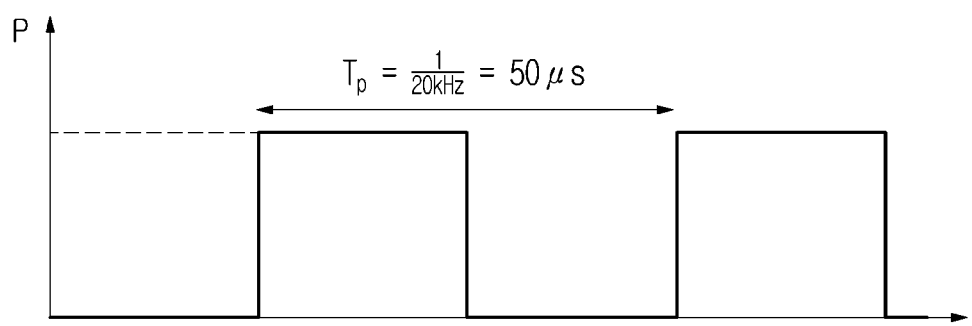
FIG. 10 is a view illustrating an example of generating an optical signal of a signal generator.

FIG. 10 is a view illustrating an example of generating an optical signal of a signal generator.

Referring to FIG. 10, the signal generator 140 may generate a signal in a 20 kHz frequency band that does not exist naturally to drive the optical transceiver. The example of the frequency of the signal generated by the signal generator 140 is not limited by the above example. Of course, it is possible to generate the signals in various frequency bands within a target range for distinguishing the signals transmitted from noise in the infrared band existing in the surrounding environment.

According to the embodiment, the signal generator 140 may adjust the duty of the generated signal in consideration of power consumption. For example, when the transmitting module 110 is mounted on the portable device 100 and driven by a battery, it is necessary to reduce power consumption to the greatest extent possible. In this case, the signal generator 140 may generate the optical signal in consideration of power consumption in the following way.

Figure 11:
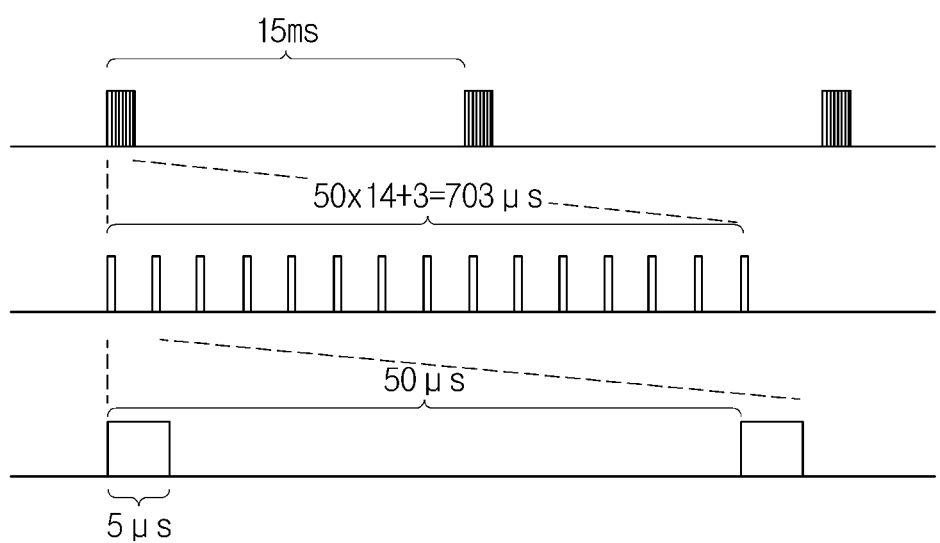
FIG. 11 is a view illustrating an example of generating an optical signal of a signal generator considering power consumption.

FIG. 11 is a view illustrating an example of generating an optical signal of a signal generator considering power consumption.

Referring to FIG. 11, the signal generator 140 may decrease the duty to 10% and reduce power consumption to ⅕ by pulse width modulation (PWM) of a driving signal of the signal transmitter. In addition, power consumption may be reduced by reducing a calculation period of the relative position and direction detection result. For example, when the calculation period of the relative position and direction detection result is reduced to 15 ms, power consumption may be reduced to about 5% or less.

The optical transceiver may allow current to flow or block to the LED of the signal transmitter 160 according to an ON/OFF signal transmitted from the signal generator 140. At this time, the optical transceiver may drive the LED of the signal transmitter 160 so that the maximum output of the signal is 1 mW/cm^2, which is a level that satisfies safety standards.

The signal transmitter 160 may be provided with the LED to transmit the optical signal. The LED has a characteristic of generating light proportional to the strength of the current flowing through a diode, and a maximum light amount, an angle of view, and the signal strength for each angle of the LED may be designed differently according to the use environment.

For example, assuming that the target electronic device 10 is a 65-inch electronic blackboard, the size of the X-axis direction in a horizontal direction and the Y-axis direction in a vertical direction of the electronic blackboard may be provided as 1430 mm and 826 mm, respectively. In the case of the electronic blackboard, since a touch interaction using the portable device 100 such as a finger or an electronic pen is mainly used at a distance close to a screen of the electronic blackboard, an area farther than a certain distance from the screen is selected as a utilization area of the disclosure.

When the installation position of the first and second receivers 230-1 and 230-2 is assumed to be the edge of the electronic device 10 as illustrated in FIG. 8, a distance between the first and second receivers 230-1 and 230-2 is maximized at a position d=1 m in front of the screen of the electronic blackboard. The angle of view (2 tan ^(−1)(L/2)) at this time is 71.1°. Therefore, in the above environment, it is preferable to apply the LED having a half angle of ±45° to the signal transmitter 160.

Figure 12:
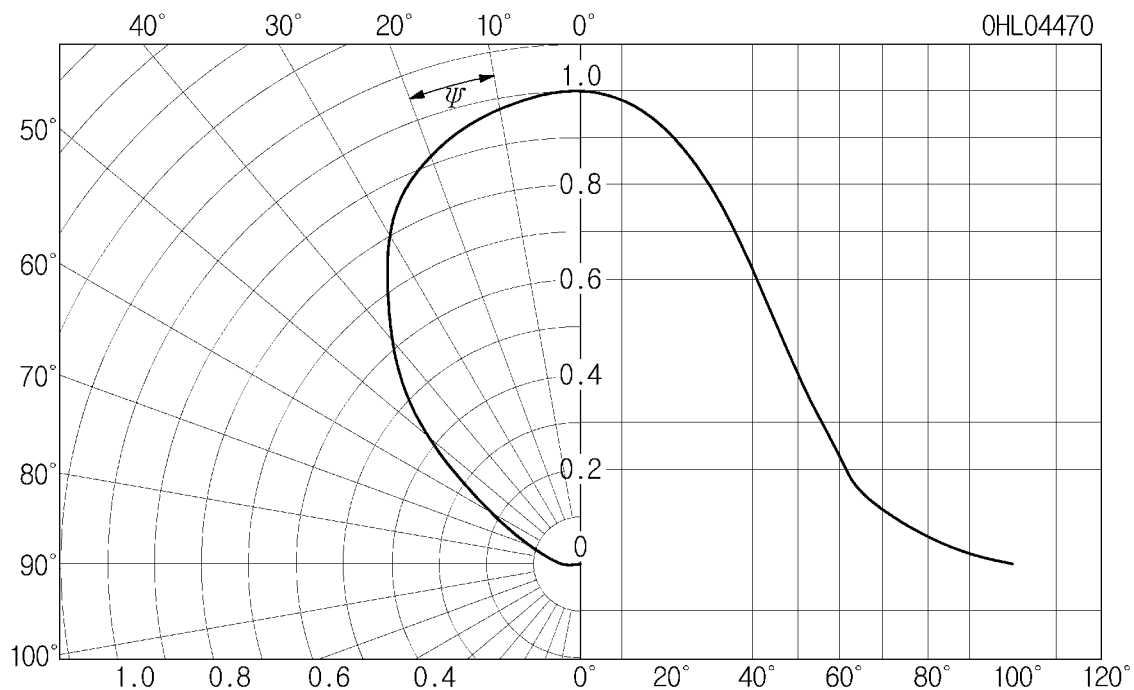
FIG. 12 is a view illustrating an example of radiation characteristics of an infrared light emitting diode.

For example, the LED having radiation characteristics as illustrated in FIG. 12 may be applied to the signal transmitter 160.

FIG. 12 is a view illustrating an example of radiation characteristics of an infrared light emitting diode. Referring to FIG. 12, the signal generated by the LED is attenuated in inverse proportion to a square of a relative distance from the signal receiver 230, and monotonically reduced according to the relative direction with the signal receiver 230 to reach the signal receiver 230 of the receiving module 220.

When the signal is transmitted from the transmitting module 110, the operation 320 of receiving the signal from the first and second receivers 230-1 and 230-2 of the receiving module 220 may be performed.

The optical signal reaching the receiving module 220 may be detected by the signal receiver 230 and then provided to a control process of the second controller 260 through the filter and amplifier 240 and the signal strength detector 250.

The signal receiver 230 may be provided with the photodiode to receive the optical signal. The photodiode has various characteristics such as a size, spectral responsivity, and relative radiant sensitivity. In order to expand the detection area of the receiving module 220, it is preferable to use the photodiode having wide sensitivity for each angle and a high spectral response characteristic to improve the power efficiency of the signal transmitter 160.

The photodiode may convert the received optical signal into a photocurrent signal, and may transmit the converted photocurrent signal to the filter and amplifier 240.

The filter and amplifier 240 may amplify the magnitude of the signal after converting the photocurrent signal to a voltage signal. In this case, a band-pass filter may be added to the amplifier to remove unnecessary noise included in the optical signal.

Figure 13:
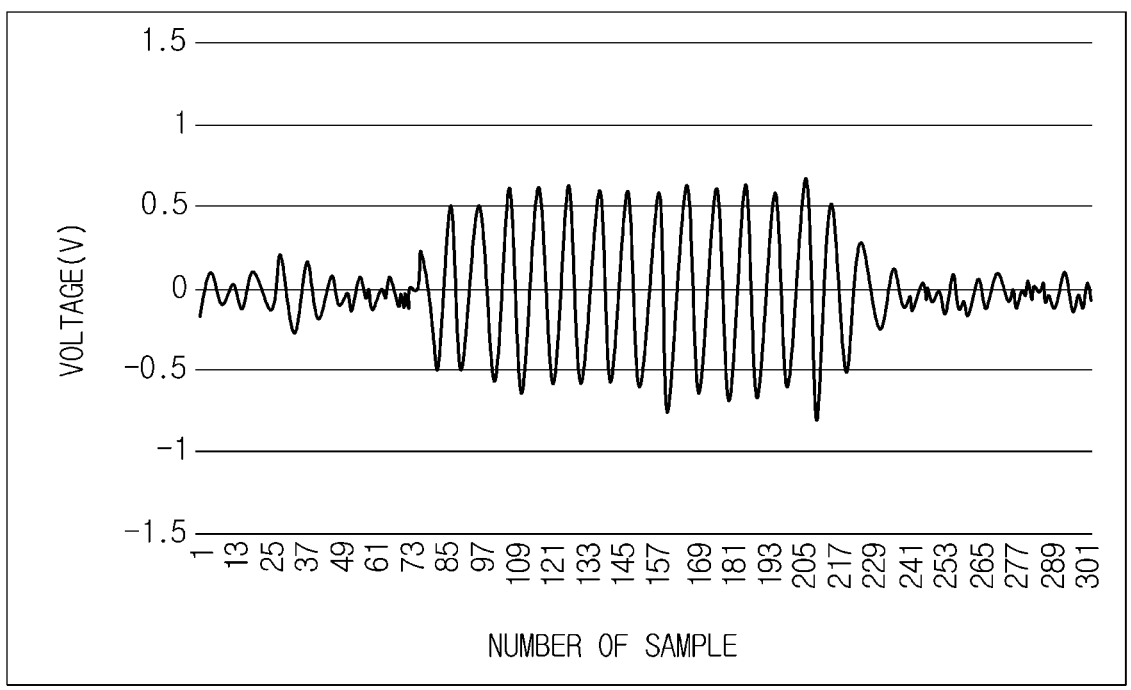
FIG. 13 is a view illustrating an example of an output signal of a filter and amplifier.

FIG. 13 is a view illustrating an example of an output signal of a filter and amplifier. FIG. 13 illustrates an example of a signal converted to 200 kps (samples per second) by applying a band-pass filter to an analog-to-digital converter (ADC). When the band-pass filter is applied to the ADC as described above, the frequency of the photocurrent signal may be varied.

The photocurrent signal amplified through the filter and amplifier 240 may be transmitted to the signal strength detector 250.

The signal strength detector 250 may measure the strength of the signal received through the envelope detector, and may transmit the measurement result to the second controller 260.

When a composite signal including the optical signals of different frequency bands is received through the signal receiver 230, the signal strength detector 250 may apply the Goertzel algorithm to extract the signal strength of individual signal components from the composite signal.

Figure 15:
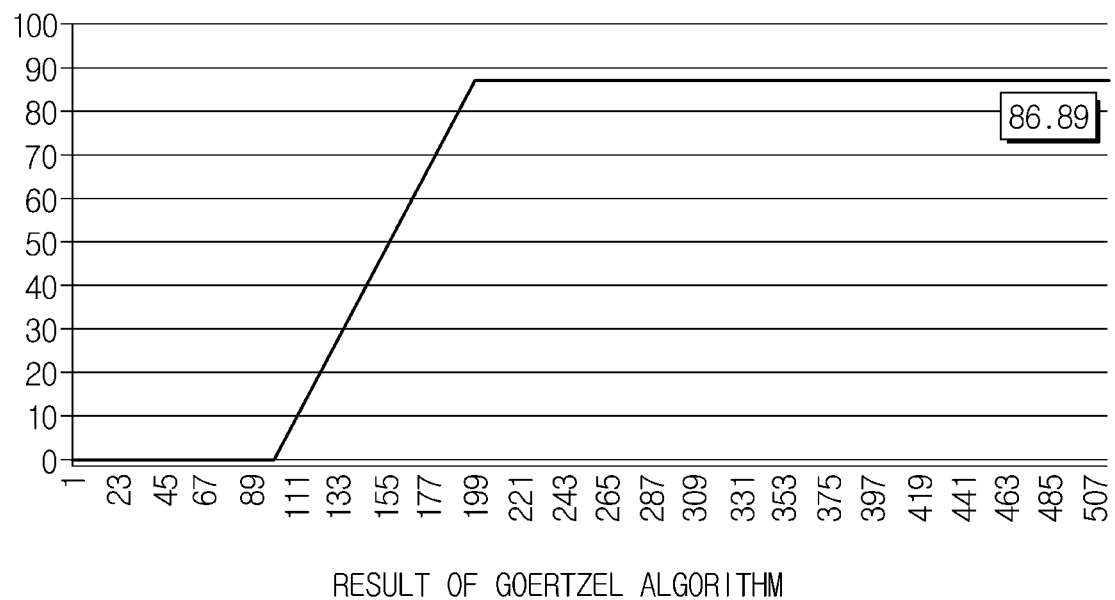
FIG. 15 is a view illustrating calculation results of the Goertzel algorithm.

FIG. 14 is a view illustrating the Goertzel algorithm for signal strength detection, and FIG. 15 is a view illustrating calculation results of the Goertzel algorithm.

When a sampling frequency fs=200 kHz, fb=20 kHz, N=512 sample data, k=[fD/fs*N]=51 is applied to the Goertzel algorithm as illustrated in FIG. 14, an operation result as illustrated in FIG. 15 may be derived.

The signal strength detector 250 may extract the strength of the individual signal components for the composite signal through the above process.

When the strength of the signal component is extracted from the signal strength detector 250, the operation 330 of detecting the relative position and direction of the portable device 100 may be performed.

The detection result of the signal strength detector 250 may be provided in the process of detecting the relative position and direction of the portable device 100 with respect to the installation position of the first and second receivers 230-1 and 230-2 in the second controller 260.

The second controller 260 may detect the relative position and direction of the portable device 100 equipped with the transmitting module 110 from a plurality of signal strength information detected from the signals detected by the first and second receivers 230-1 and 230-2.

Hereinafter, a method of detecting the relative position and direction of the portable device 100 in the second controller 260 will be described in detail with reference to the accompanying drawings.

Figure 16:
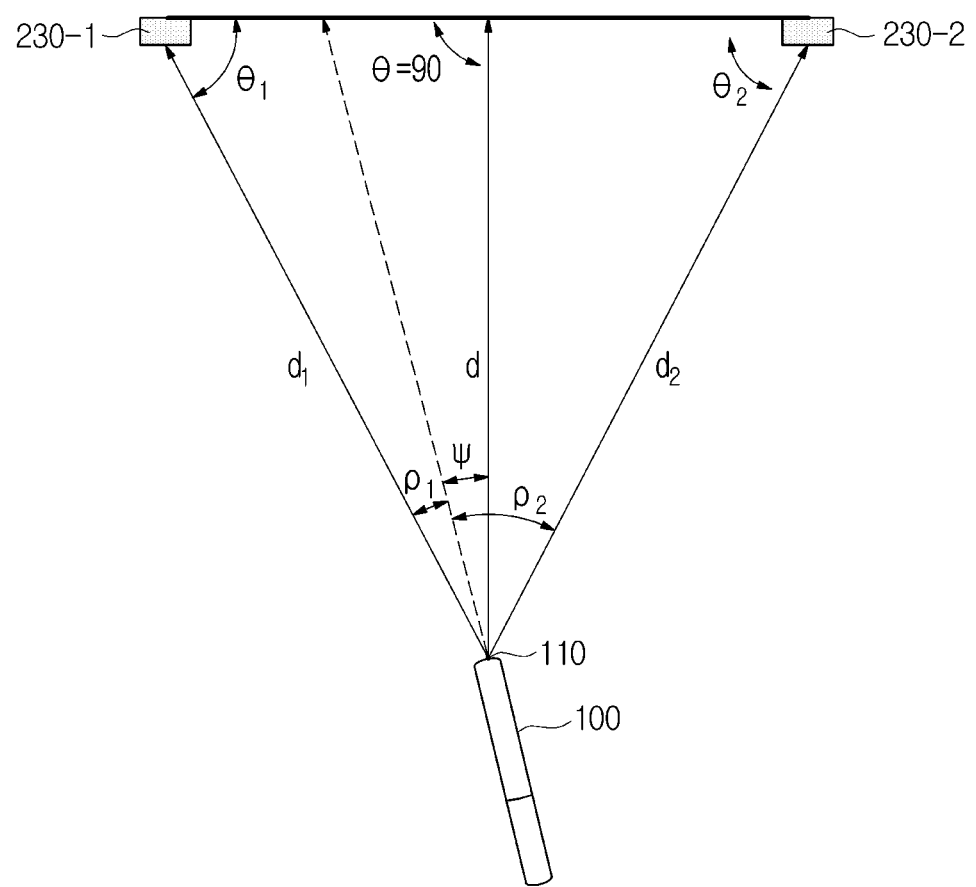
FIG. 16 is a view illustrating a system model for an X-direction of the system illustrated in FIG. 8.

FIG. 16 is a view illustrating a system model for an X-direction of the system illustrated in FIG. 8.

In FIG. 16, L may refer to a distance between the first receiver 230-1 and the second receiver 230-2, T may refer to a relative angle of the portable device 100, d1 may refer to a distance from the first receiver 230-1 to the portable device 100, d2 may refer to a distance from the second receiver 230-2 to the portable device 100, d may refer to a vertical distance (hereinafter, referred to as 'vertical distance d') to a virtual line connecting the first and second receivers 230-1 and 230-2 of the portable device 100, ρ1 and ρ2 may refer to relative angles to the first receiver 230-1 and the second receiver 230-2 of the portable device 100, 01 may refer to an angle of incidence of the optical signal to the first receiver 230-1, and 02 may refer to an angle of incidence of the optical signal to the second receiver 230-2.

Referring to FIG. 16, the signal transmitted from the transmitting module 110 of the portable device 100 may be received through the first and second receivers 230-1 and 230-2 of the apparatus of detecting the relative position 200 and provided to the process of detecting the relative positions of the first and second receivers 230-1 and 230-2 of the portable device 100.

The second controller 260 may detect the relative position and direction of the portable device 100 with respect to the installation positions of the first and second receivers 230-1 and 230-2 including the vertical distance d to the virtual line connecting the first and second receivers 230-1 and 230-2 and the relative angle Ψ of the portable device 100 based on the signals received from the first and second receivers 230-1 and 230-2.

More particularly, the second controller 260 may calculate the vertical distance d to the virtual line connecting the first and second receivers 230-1 and 230-2 of the portable device 100 from Equation 1 below.

$$d = \left(\frac{K}{\sqrt{s_1 + s_2}} - \alpha\right) * \beta \quad \text{Equation 1}$$

In Equation 1, s1 may be the strength of the signal detected by the first receiver 230-1, s2 may be the strength of the signal detected by the second receiver 230-2, k may be a coefficient for converting a unit of a digital value of the signal derived through the amplifier and the ADC, and α and β may be coefficients determined from the installation intervals of the first and second receivers 230-1 and 230-2.

In addition, the second controller 260 may calculate the relative angle Ψ of the portable device 100 as illustrated in Equation 2 below.

$$\psi = \frac{s_1 - s_2}{s_1 + s_2} * \gamma * d \quad \text{Equation 2}$$

In Equation 2, s1 may be the strength of the signal detected by the first receiver 230-1, s2 may be the strength of the signal detected by the second receiver 230-2, and γ may be a coefficient determined from the installation interval of the first and second receivers 230-1 and 230-2.

According to the embodiment, the second controller 260 may calculate coordinates of a point that the portable device 100 indicates to the reference plane of the electronic device 10 based on a midpoint of the virtual line connecting the first and second receivers 230-1 and 230-2 based on the vertical distance d and the relative angle Ψ information of the portable device 100 derived through Equations 1 and 2.

Hereinafter, the calculation process of Equations 1 and 2 used in the second controller 260 will be described to help understanding.

Referring to FIG. 16, the distance d1 from the first receiver 230-1 to the portable device 100 and the distance d2 from the second receiver 230-2 to the portable device 100 are given by Equation 3 below. The incident angle θ1 of the optical signal to the first receiver 230-1 and the incident angle θ2 of the optical signal to the second receiver 230-2 are given as in Equation 4 below.

$$d_1 = d_2 = \sqrt{\left(\frac{L}{2}\right)^2 + d^2} \quad \text{Equation 3}$$

$$\theta_1 = \theta_2 = \tan^{-1}\frac{2d}{L} \quad \text{Equation 4}$$

In addition, the relative angles ρ1 and ρ2 with respect to the first receiver 230-1 and the second receiver 230-2 of the portable device 100 are given as in Equations 5 and 6 below.

$$\rho 1 = 90 - \theta 1 - \psi, \rho 2 = 90 - \theta 1 + \psi \quad \text{Equation 5}$$

When the radiation characteristics of the portable device 100 is called T(ψ), and sensitivity characteristics of the signal receiver 230 is called R(ψ), the detecting signal by the portable device 100 located at a relative characteristic d and the relative angle ψ may be expressed as Equation 6 below.

$$s_1(d, \psi, \theta_1) = \frac{k}{d^2}T(\psi)R(\theta_1),$$

$$s_2(d, \psi, \theta_2) = \frac{k_2}{d^2}T(\psi)R(\theta_2) \quad \text{Equation 6}$$

Equations 1 and 2 are each derived from Equation 6.

As an example, simulation was performed using the radiation characteristics T(ψ) of the LED and sensitivity characteristics R(θ1) and R(θ2) of Vishay's VBPW34FAS photodiode.

Figure 17:
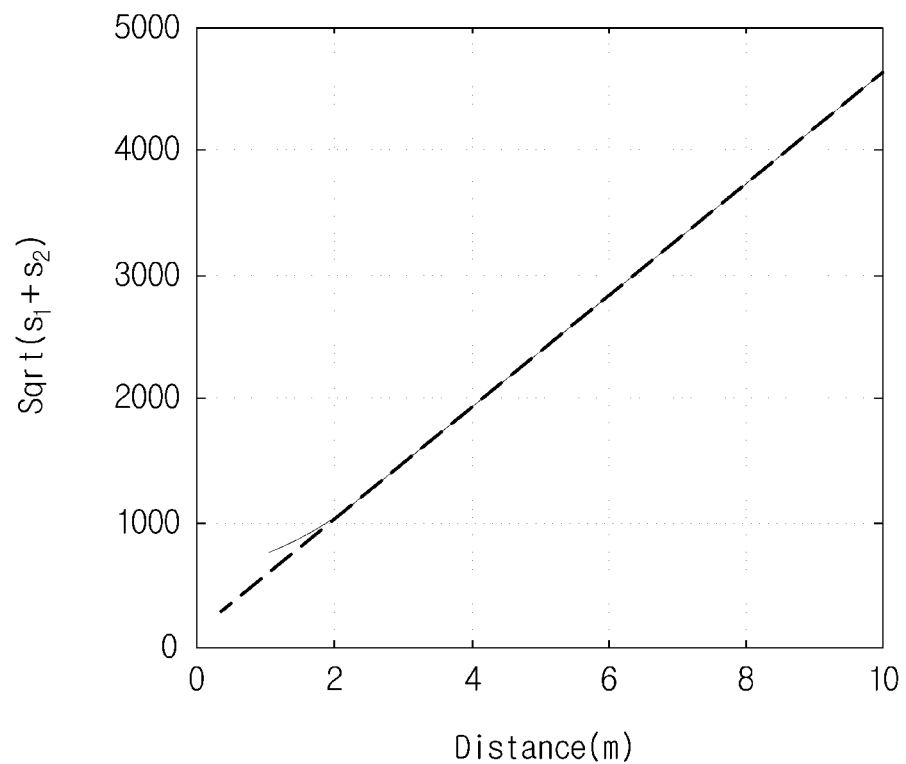
FIG. 17 is a graph illustrating a relationship between a distance and a measured signal strength.

As a result of the simulation, it was identified that the reciprocal of the square root of the sum of the detected signal strengths illustrates a relationship as illustrated in FIG. 17 according to the distance.

FIG. 17 is a graph illustrating a relationship between a distance and a measured signal strength. When the graph of FIG. 17 is expressed by an equation, Equation 1 may be derived.

Figure 18:
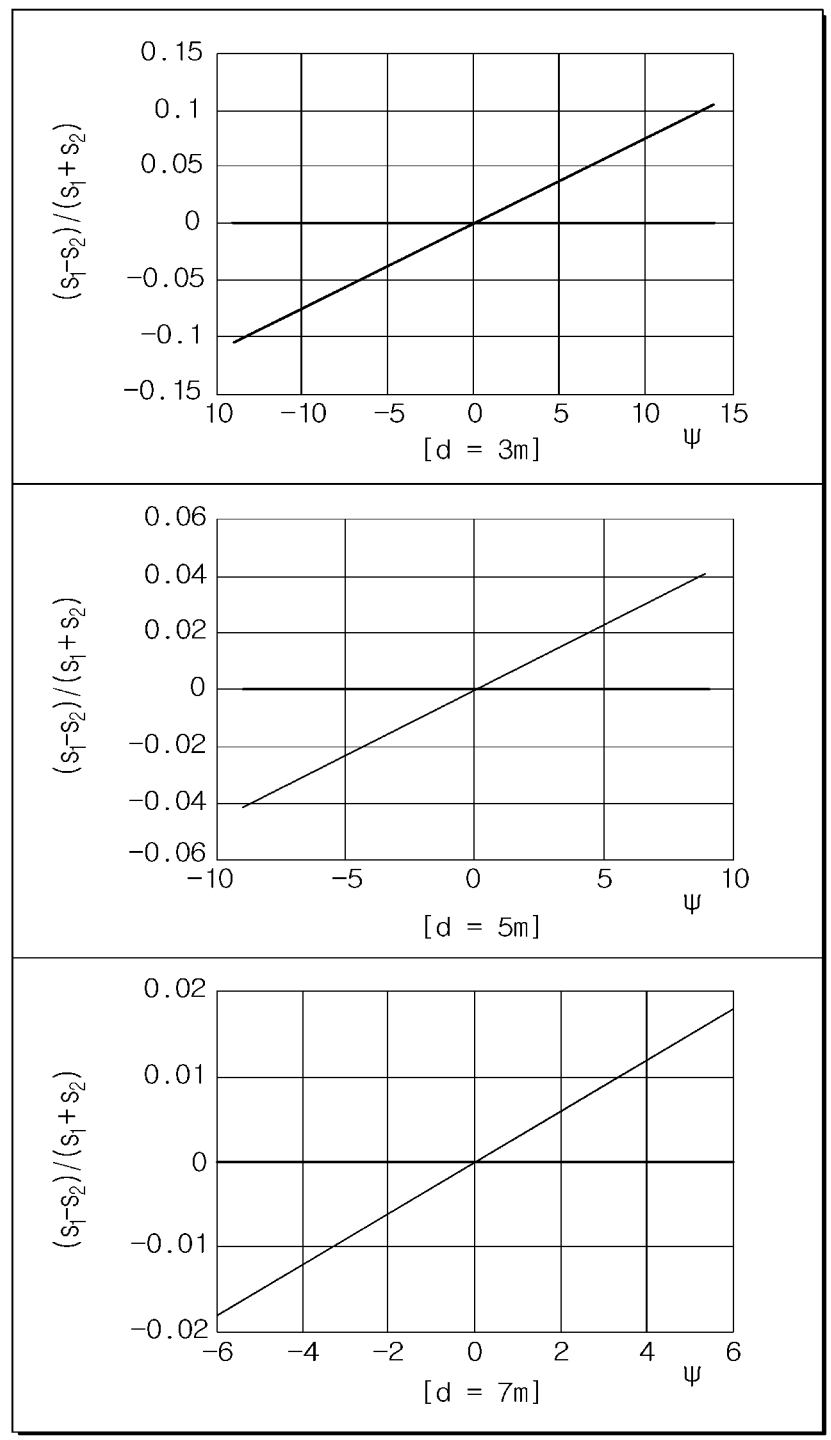
FIG. 18 is a graph illustrating a relationship between a relative angle and a measured signal strength with respect to a vertical distance.

In addition, it was identified that the relative angle T of the portable device 100 illustrates a relationship as illustrated in FIG. 18 with a relative distance d and the detected signal strengths s1 and s2.

FIG. 18 is a graph illustrating a relationship between a relative angle and a measured signal strength with respect to a vertical distance. In more detail, the relationship between the relative angle and the strength of the measured signal is illustrated in the case where the vertical distance d is 3 m, 5 m, and 7 m. When the graph of FIG. 18 is expressed by an equation, Equation 2 may be derived.

On the other hand, according to the embodiment, the method of detecting the relative position of the portable device 100 may further include an operation of calculating coordinates of the point indicated by the portable device 100 based on the midpoint of the virtual line connecting the first and second receivers 230-1 and 230-2 based on the relative distance d and the relative angle Ψ information of the portable device 100. Here, the reference plane may refer to the reference plane of the electronic device 10, and the electronic device 10 may display a preset image in the calculated coordinates. Hereinafter, descriptions overlapping with the above-described contents will be omitted.

The method of calculating the vertical distance d and the relative angle Ψ of the portable device 100 by the first and second pair of receivers 230-1 and 230-2 based on the X-axis direction of FIG. 8 has been described. The above process may be applied to other receivers installed based on the X-axis direction. In addition, the same method may be applied to other receivers installed based on the Y-axis direction of FIG. 8, and as a result, the coordinates of the point that the portable device 100 indicates to the reference plane of the electronic device 10 may be calculated.

Although a few embodiments of the apparatus and the method of detecting the relative position have been illustrated and described, it would be appreciated by those skilled in the art that changes may be made in these embodiments without departing from the principles and spirit of the inventive concepts, the scope of which is defined in the claims and their equivalents.

The invention claimed is:

1. An apparatus of detecting a relative position comprising:
first and second receivers configured to receive signals transmitted from a portable device; and
a processor configured to determine a position where the portable device is located and a direction indicated by the portable device based on a strength of a first signal received by the first receiver and a strength of a second signal received by the second receiver,
wherein the processor is configured to
determine the position where the portable device is located based on a sum between the strength of the first signal and the strength of the second signal, and
determine the direction indicated by the portable device based on a difference between the strength of the first signal and the strength of the second signal.

2. The apparatus of detecting the relative position according to claim 1, wherein the processor is configured to determine the strength of each of the first signal and the second signal using a maximum value of an envelope of each of the first signal and the second signal.

3. The apparatus of detecting the relative position according to claim 1, wherein the processor is configured to determine the strength of each of the first signal and the second signal using the Goertzel algorithm.

4. The apparatus of detecting the relative position according to claim 1, wherein the processor is configured to determine a distance between the apparatus of detecting the relative position and the portable device based on the sum between the strength of the first signal and the strength of the second signal and a distance between the first receiver and the second receiver.

5. The apparatus of detecting the relative position according to claim 4, wherein the processor is configured to determine the direction indicated by the portable device based on the distance between the apparatus of detecting the relative position and the portable device and the difference between the strength of the first signal and the strength of the second signal.

6. The apparatus of detecting the relative position according to claim 5, wherein the processor is configured to determine a relative position of the portable device with respect to the apparatus of detecting the relative position based on the distance between the apparatus of detecting the relative position and the portable device and the direction indicated by the portable device.

7. The apparatus of detecting the relative position according to claim 1, wherein the processor is configured to determine the direction indicated by the portable device based on a pattern of a strength of the signal transmitted from the portable device and the strength of the signal received by the first and second receivers.

8. The apparatus of detecting the relative position according to claim 7, wherein the strength of the signal transmitted from the portable device has a maximum strength in the direction indicated by the portable device, and
wherein the strength of the signal transmitted from the portable device decreases as it moves away from the direction indicated by the portable device.

9. A method of detecting a relative position comprising:
receiving signals transmitted from a portable device through first and second receivers;
determining a position where the portable device is located based on a sum between a strength of a first signal received by the first receiver and a strength of a second signal received by the second receiver; and
determining a direction indicated by the portable device based on a difference between the strength of the first signal and the strength of the second signal.

10. The method according to claim 9, further comprising:
determining the strength of each of the first signal and the second signal using a maximum value of an envelope of each of the first signal and the second signal.

11. The method according to claim 9, further comprising:
determining the strength of each of the first signal and the second signal using the Goertzel algorithm.

12. The method according to claim 9, further comprising:
detecting a distance between an apparatus of detecting a relative position and the portable device based on the sum between the strength of the first signal and the strength of the second signal and a distance between the first receiver and the second receiver.

13. The method according to claim 12, further comprising:
detecting the direction indicated by the portable device based on the distance between the apparatus of detecting the relative position and the portable device and the difference between the strength of the first signal and the strength of the second signal.

14. The method according to claim 13, further comprising:
detecting a relative position of the portable device with respect to the apparatus of detecting the relative position based on the distance between the apparatus of detecting the relative position and the portable device and the direction indicated by the portable device.

15. The method according to claim 9, further comprising:
detecting the direction indicated by the portable device based on a pattern of a strength of the signal transmitted from the portable device and the strength of the signal received by the first and second receivers,
wherein the strength of the signal transmitted from the portable device has a maximum strength in the direction indicated by the portable device, and
wherein the strength of the signal transmitted from the portable device decreases as it moves away from the direction indicated by the portable device.

* * * * *